US012607998B2

(12) United States Patent
Myers et al.

(10) Patent No.: US 12,607,998 B2
(45) Date of Patent: Apr. 21, 2026

(54) REMOTE OPERATION OF UNMANNED VEHICLE USING HOSTED WEB SERVER

(71) Applicant: Textron Systems Corporation, Hunt Valley, MD (US)

(72) Inventors: Michael Shawn Myers, New Freedom, PA (US); Matthew Kenneth Greene, Baltimore, MD (US); Justin Ross Stahler, Jarretsville, MD (US)

(73) Assignee: TEXTRON SYSTEMS CORPORATION, Hunt Valley, MD (US)

( * ) Notice: Subject to any disclaimer, the term of this patent is extended or adjusted under 35 U.S.C. 154(b) by 221 days.

(21) Appl. No.: 18/200,897

(22) Filed: May 23, 2023

(65) Prior Publication Data

US 2023/0384783 A1     Nov. 30, 2023

Related U.S. Application Data

(60) Provisional application No. 63/453,859, filed on Mar. 22, 2023, provisional application No. 63/345,111, filed on May 24, 2022.

(51) Int. Cl.
*G05D 1/00*          (2024.01)
*H04L 67/56*          (2022.01)

(52) U.S. Cl.
CPC .......... *G05D 1/0022* (2013.01); *H04L 67/56* (2022.05)

(58) Field of Classification Search
CPC ..... G05D 1/0022; G05D 1/0016; H04L 67/56

USPC .............................................................. 701/2
See application file for complete search history.

(56) References Cited

U.S. PATENT DOCUMENTS

| | | | |
|---|---|---|---|
| 6,826,607 B1 | 11/2004 | Gelvin et al. | |
| 7,174,238 B1 | 2/2007 | Zweig | |
| 7,894,952 B2 | 2/2011 | Donovan et al. | |
| 9,477,226 B2 | 10/2016 | Olson et al. | |
| 9,513,635 B1* | 12/2016 | Bethke ................ | G05D 1/0094 |
| 10,365,645 B1 | 7/2019 | Chambers et al. | |
| 10,454,576 B2 | 10/2019 | Sham | |
| 10,673,520 B2 | 6/2020 | Westrup et al. | |
| 10,768,921 B2 | 9/2020 | Sharma | |
| 10,996,684 B2 | 5/2021 | Li | |
| 2014/0179274 A1* | 6/2014 | O'Meara ............ | H04L 63/0281 |
| | | | 455/411 |
| 2015/0100461 A1 | 4/2015 | Baryakar et al. | |

(Continued)

*Primary Examiner* — Vivek D Koppikar
*Assistant Examiner* — Dominick Mulder
(74) *Attorney, Agent, or Firm* — BainwoodHuang

(57)     ABSTRACT
A system for remote operation of an unmanned vehicle (UV) includes a control station having a communication link to the UV and executing a web browser for (1) receiving web pages of a UV control web application, (2) rendering the web pages on the control station, (3) receiving control input from an operator via rendered web pages, and (4) generating messages on the communication link based on the control input. A hosted server system is coupled to the control station via the communication link and to internal subsystems of the UV for flight control, mission control, navigation, and system monitoring, and (1) executes a web server serving the web pages of the UV control web application to the control station for the above operations of the web browser, and (2) provides back-end controls to the internal subsystems based on the control input from the operator.

11 Claims, 6 Drawing Sheets

(56)         References Cited

U.S. PATENT DOCUMENTS

| | | | |
|---|---|---|---|
| 2015/0336671 A1* | 11/2015 | Winn | G05D 1/0202 |
| | | | 701/3 |
| 2016/0144959 A1* | 5/2016 | Meffert | B64U 10/13 |
| | | | 701/3 |
| 2016/0214715 A1* | 7/2016 | Meffert | B64U 20/87 |
| 2016/0266579 A1* | 9/2016 | Chen | G05D 1/0044 |
| 2017/0083979 A1* | 3/2017 | Winn | G06Q 20/102 |
| 2017/0192418 A1* | 7/2017 | Bethke | B64U 10/13 |
| 2018/0004207 A1 | 1/2018 | Michini et al. | |
| 2018/0201226 A1* | 7/2018 | Falkson | B60R 25/257 |
| 2019/0391575 A1 | 12/2019 | Hortner | |
| 2021/0088337 A1* | 3/2021 | Koubaa | G05D 1/0022 |
| 2021/0101678 A1 | 4/2021 | Fang et al. | |
| 2021/0343170 A1* | 11/2021 | Meier | G05D 1/0808 |
| 2022/0065657 A1* | 3/2022 | Wang | G01C 21/387 |
| 2022/0169401 A1* | 6/2022 | Di Cosola | B60L 53/51 |
| 2022/0390940 A1* | 12/2022 | Richman | G05D 1/0016 |
| 2022/0399936 A1* | 12/2022 | Arksey | H04B 7/18504 |
| 2023/0136508 A1* | 5/2023 | Rabinowitz | G05D 1/0094 |
| | | | 705/5 |

* cited by examiner

72

MAP TILE SERVER AND
DIGITAL ELEVATION 78

70

TROUBLESHOOTING
76

ALERTS 74

REMOTE OPERATION OF UNMANNED VEHICLE USING HOSTED WEB SERVER

BACKGROUND

The invention relates to the field of remote operation of unmanned vehicles, including but not limited to unmanned aerial vehicles. The present description focuses on the UV application in particular, but those skilled in the art will appreciate the applicability to other types of unmanned vehicles.

SUMMARY

In known arrangements for remotely operating an unmanned vehicle (UV), specific UV control software is installed on a ground device that controls the UV. Traditional remote-control technologies provide a low-level messaging format that must be sent outside of an air vehicle boundary for processing and display in proprietary software. It is also necessary to support configuration management on the control software, to provide for updating as functions or configurations of the target UV(s) change.

In a disclosed approach, a "hosted" Web Server processing unit is used, i.e., one that is located away from the ground-based control device. In one example, the web server is an embedded server installed into the UV. The control software is installed on the embedded webserver that interfaces with the air vehicle systems (e.g., flight controller, aircraft subsystems, mission systems, payload and external interfaces). A remote operator with network connection has access to the control software via a Web Browser and has the ability to fly and execute autonomous mission sets.

This solution shifts the paradigm from hosting the human machine interface control software on a remote controller to hosting the control software elsewhere in the system, such as on the controlled vehicle. Other example hosting arrangements are also described.

The Web Server manages protocol services for communicating with the air vehicle subsystems by utilizing Input Output (I/O) protocols. In one embodiment, the Web Server obtains real time status feedback and tasking capability over the air vehicle subsystems from its protocol service interactions. The Web Server allows for an operator to connect to the system using a web browser through the data link. Once the operator's web browser is connected, the embedded web server publishes air vehicle subsystem telemetry allowing real time status updates within the operator's browser. The web server defines an application interface (API) for tasking state and command data to the air vehicle. Operator web browser interactions transmitted to the server are processed and routed as I/O commands to the autopilot and subsystems.

The following are potential advantages of the disclosed technique:

It provides remote control capability from any device with a web browser. There is no need for custom ground control software to be installed on an operator's computing device. Traditional remote-control technologies provide a low-level messaging format that must be sent outside of the air vehicle boundary for processing and display in proprietary software.

Because the UV hosts the control software, the remote operator computer software does not need to updated as functions or configurations change. This is because the full capability of the UV control software in enabled by the web browser. Because of this there is no requirement to support configuration management on the ground control software.

The webserver is able to define a complete API set based on available aircraft subsystem services at a single connection point.

The webserver may adopt standards, such as W3C Open web platform, that provide rich interactive experiences on any device.

Remote control from any computer device with a web browser is possible. Loading proprietary software on the computer device is not required.

The solution is disclosed in the context of an unmanned air vehicle system, but the concept may be more broadly applicable to remotely operated unmanned vehicles generally. Additionally, although control of the UV (e.g., flight control) is a key aspect of operation, the solution can also be used for other functions such as monitoring, maintenance activities, payload control, etc.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

In one aspect, a system is disclosed for remote operation of an unmanned vehicle (UV), such as an unmanned aerial vehicle. The system includes a control station used by an operator and having a communication link for controlling operation of the UV, the control station executing a web browser capable of (1) receiving web pages of a UV control web application, (2) rendering the web pages on the control station, (3) receiving control input from the operator via rendered web pages, and (4) generating corresponding messages (e.g., hypertext messages) on the communication link to the UV based on the control input. The system further includes a hosted server system coupled to the control station via the communication link and to internal subsystems of the UV for control. The hosted server system (1) executes a web server serving the web pages of the UV control web application to the control station for the rendering, receiving and generating operations of the web browser, and (2) provides back-end controls to the internal subsystems based on the control input from the operator via the web application.

Figures 1, 2:
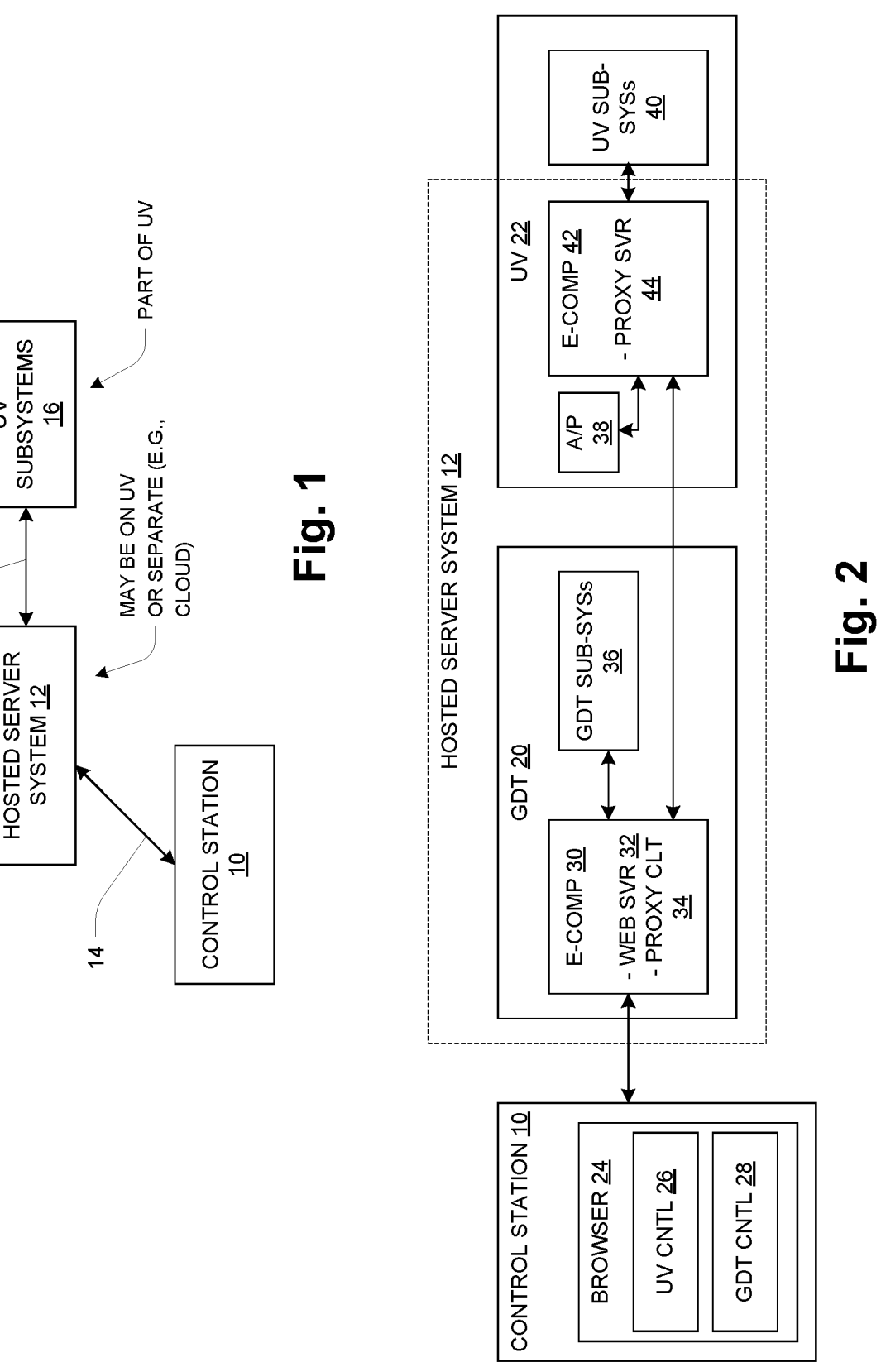
FIG. 1 is a block diagram of a remotely operated, unmanned vehicle (UV) highlighting a control arrangement.
FIG. 2 is a block diagram of a remotely operated UV showing additional detail according to a first general type of control arrangement.

FIG. 1 shows a system block diagram. Overall, the system includes a control station 10 (typically ground-based) coupled to a hosted server system 12 via a first communications link 14, and a set of UV subsystems 16 (of a UV, not depicted) coupled to the hosted server system 12 via a second communications link 18. The UV subsystems 16 of the UV may include for example an autopilot, engine speed control (ESC), engine control unit (ECU), microcontroller, GPS, and radio. As indicated, in one embodiment the hosted server system employs a web server located on the UV, i.e., co-located with the UV subsystems 16, in which case the second link 18 is typically a localized communications link of the UV (e.g., a LAN). Alternatively, the web server of the hosted server system 12 may be located elsewhere, e.g., in a data center or other ground location. In one embodiment the web server is hosted in a so-called "cloud" server, i.e., one of a collection of servers used with other computing infrastructure to provide a generalized computing service to external client-type systems such as the control station 10. These two arrangements are described in additional detail below.

FIG. 2 shows a more detailed block diagram according to a first general arrangement in which the hosted server system 12 is deployed partly in a ground data terminal (GDT) 20 interposed between the control station 10 and a UV 22. The control station 10 executes a browser 24 which may be of a generally known type (e.g., Chrome® or Edge®), and in operation the browser 24 handles both UV control (CNTL) content 26 as well as GDT control content 28. The GDT 20 includes an embedded computer (E-COMP) 30 having a hosted web server 32 and a proxy client 34, along with GDT subsystems (SUB-SYSs) 36 such as datalinks and antenna pointing components. The UV 22 is shown as including an autopilot (A/P) 38, UV subsystems 40, and an embedded computer 42 executing a proxy server 44.

In operation, the web server 32 of GDT 30 serves browser compatible content such as JavaScript, HTML, static files, etc. to the browser 24 of the control station 10 using browser compatible protocols such as HTTP/HTTPS, Web sockets, WebRTC, etc., for local rendering to a user/operator at the control station 10. The UV control content 26 served by the web server 32 can include pages for mission planning, launch, mission control, navigation control, health/status monitoring, and landing. Served GDT control content 28 can include antenna pointing controls and datalink management. The operator uses control features of rendered pages (e.g., buttons, selection menus, etc.) to issue UV control commands and GDT control commands without the need for any proprietary software in the control station 10. Control-related messages from the browser 24 are provided to the proxy client 34 which reissues them to the proxy server 44 of UV 22, which in turn translates the commands from the web API into component specific commands for the UV subsystems 40. Telemetry and responses from the UV subsystems 40 are translated back via the proxy server 44, proxy client 34 and web server 32 to be provided to the browser 24. Example UV subsystems 40 include flight controls, mission controls, and navigation controls.

It will be appreciated that the control station 10 and E-COMPs 30, 42 are all computerized devices generally including one or more processors, memory, and I/O interface circuitry on one or more system buses, along with local nonvolatile secondary storage, with communications-type interfaces for the external communications links and other interfaces or specialized I/O circuitry as may be needed. The computerized devices store and execute computer program instructions to realize functionality as described herein.

Figure 3:
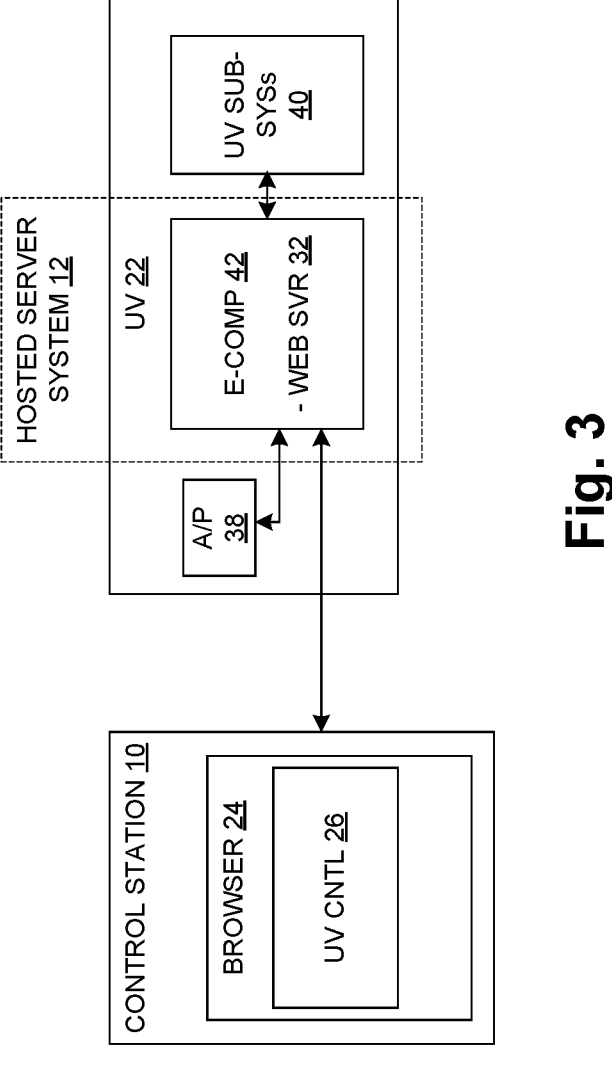
FIG. 3 is a block diagram of a remotely operated UV showing additional detail according to a second general type of control arrangement.

FIG. 3 shows a detailed block diagram according to a second general arrangement in which the hosted server system 12 is located entirely on the UV 22 itself, being in direct communication with the control station 10 as well as with the local UV subsystems 40 (i.e., no proxy client 34 and proxy server 44 are employed). Overall functionality may be similar to that of FIG. 2 as described above, i.e., serving and use of web pages, etc., but done more directly and omitting the proxying operations of that arrangement.

Figure 4:
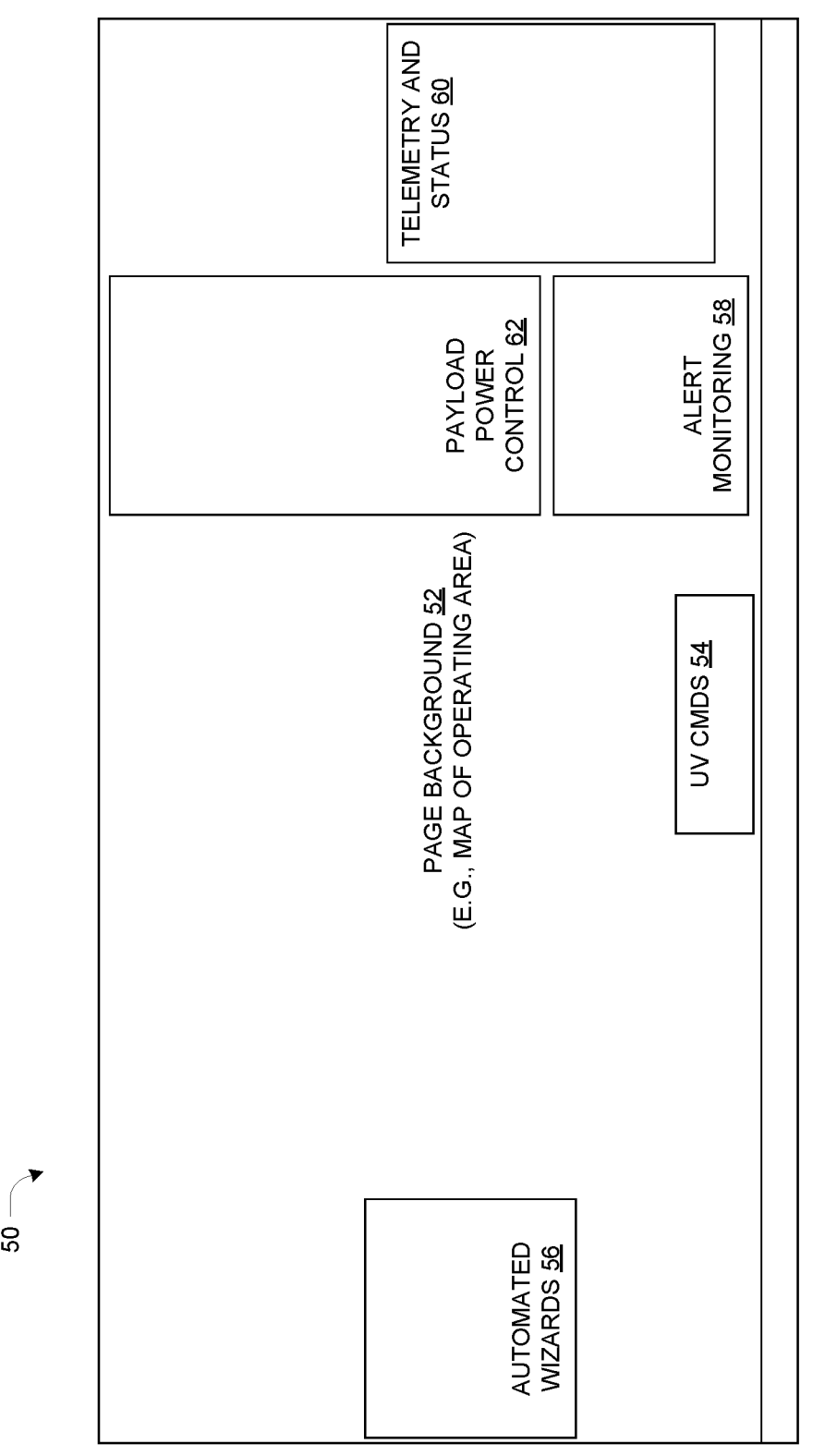
FIGS. 4, 5A-5B and 6 are depictions of web pages of a graphical user interface displayed and used on a control station.

FIG. 4 is a screenshot of a main page (home page) 50 of the web application served by the web server 32. It includes various components overlaid onto a page background 52, which may be for example a map of an operating area of the UV 22. The components can include controls for UV commands 54 and automated wizards 56 for guiding users through aircraft activities such as maintenance, launching, landing, and reconfiguration. The application can also support built in testing (BIT), alert monitoring 58, telemetry and status 60, as well as tasking subsystem components such as powering aircraft payloads 62.

Figures 5A, 5B:
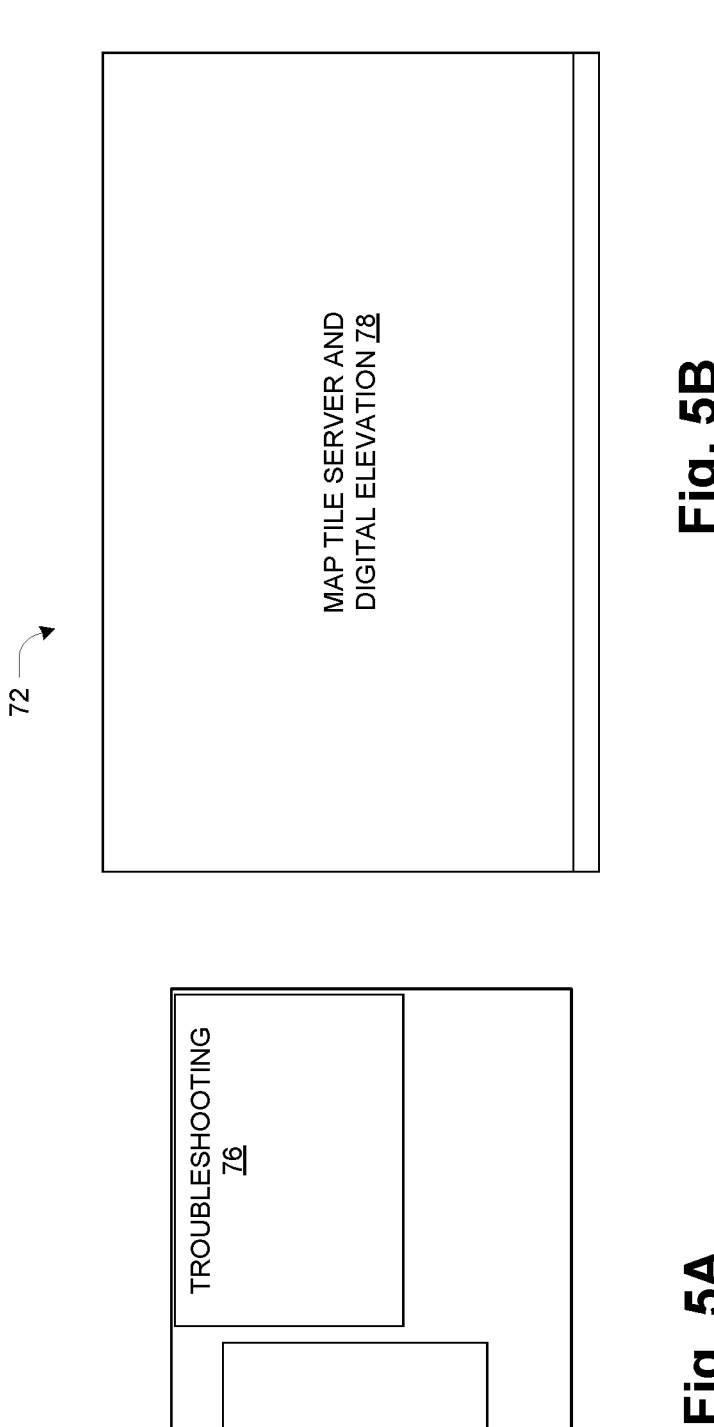

FIGS. 5A and 5B show other example pages 70, 72 of the web application. The page 70 may be a specialized page used for troubleshooting system issues, containing a set of alerts 74 and troubleshooting indicators/controls 76. The page 72 displays mapping tiles and digital elevation information 78 also served to the browser.

Figure 6:
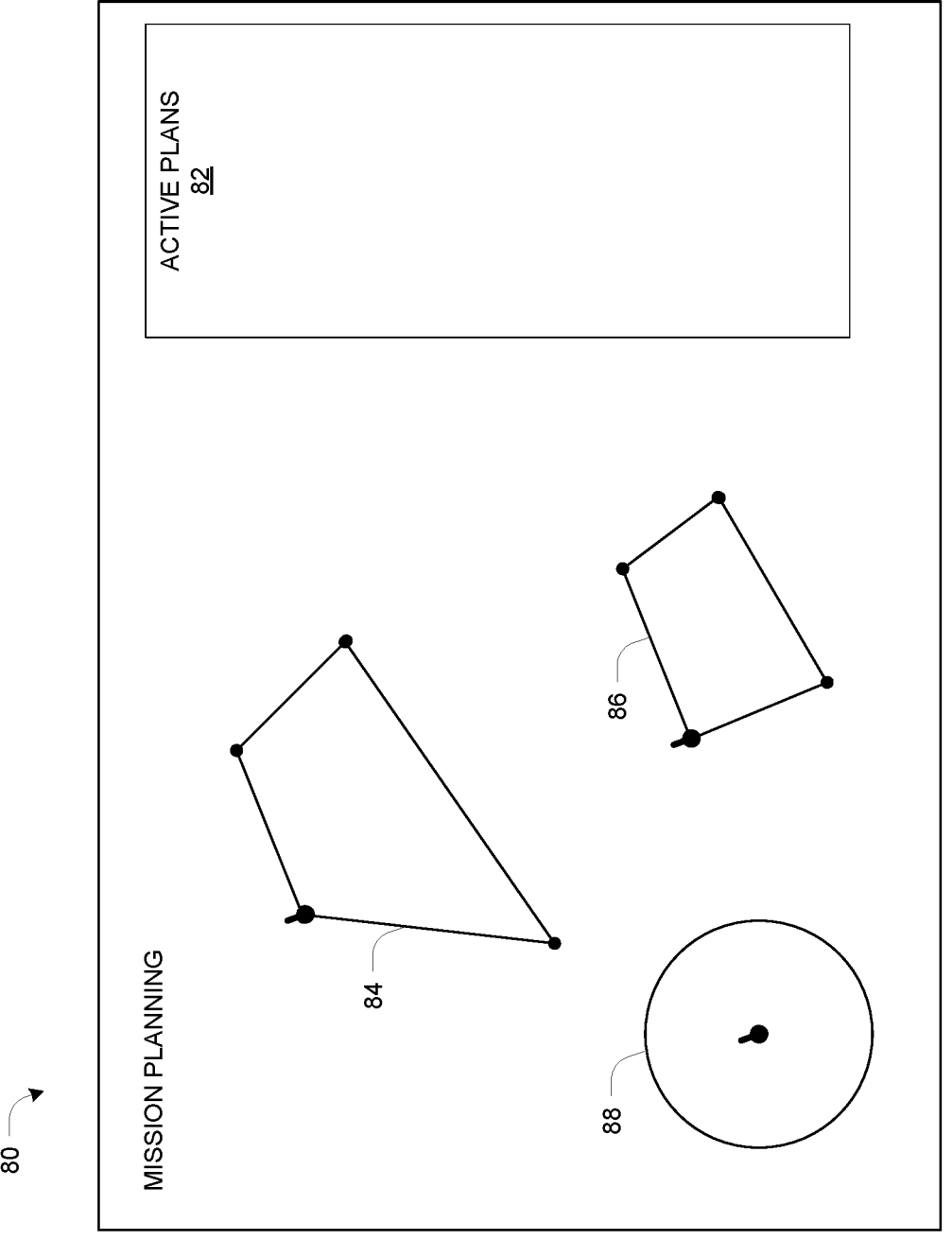

FIG. 6 shows an example mission planning page 80 providing an ability to plan and execute flight plans 82 and execute vehicle specific commands. The FIGS. 84, 86 and 88 are planned flight trajectories/paths drawn by an operator (over an operating area appearing in the page background, not depicted) in the flight planning process.

Figure 7:
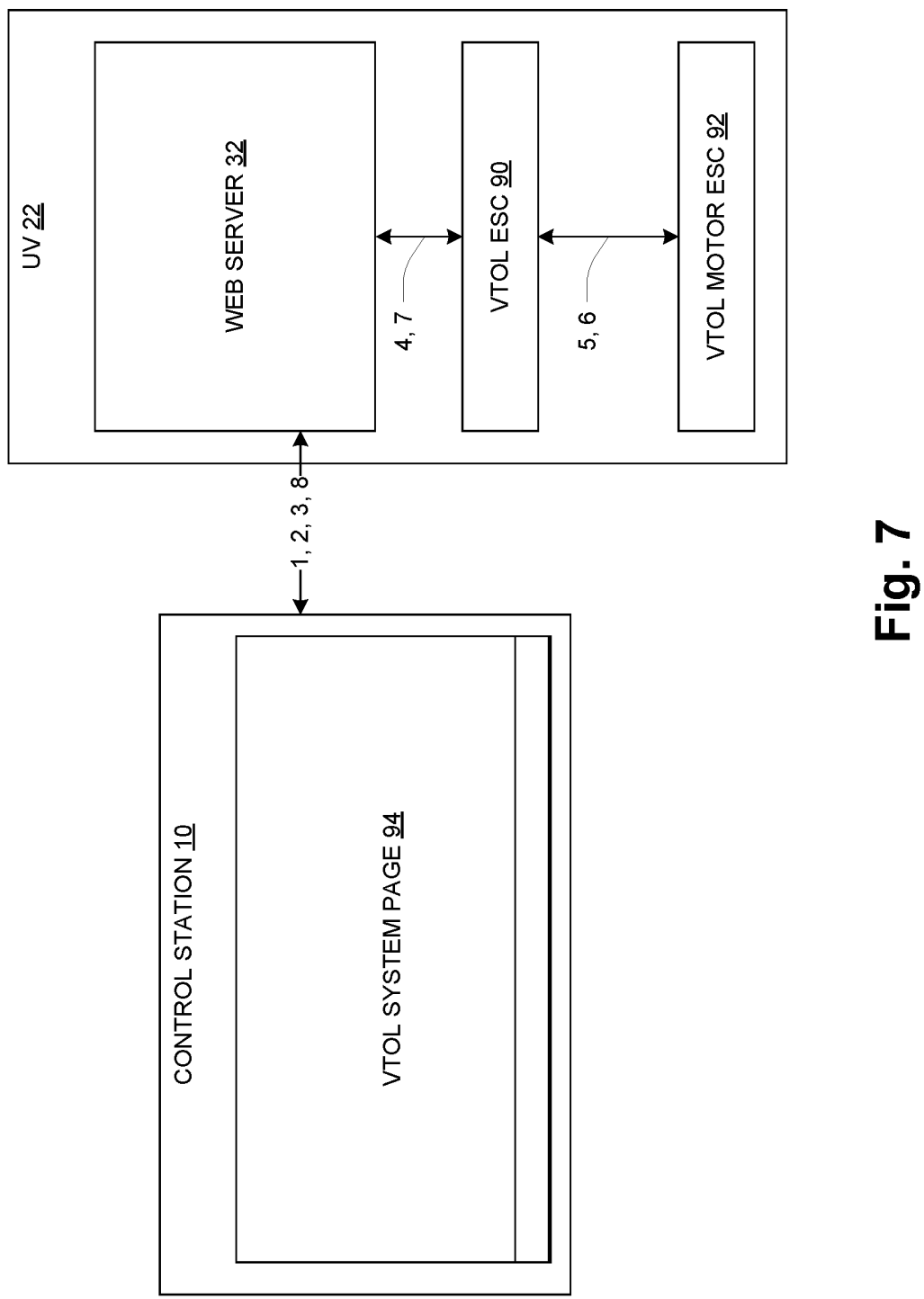
FIG. 7 is schematic depiction of a process by which web pages are requested from a web server and delivered to a control station.

FIG. 7 illustrates an operation example. The UV 22 is shown as including the web server 32 as well as a VTOL engine speed control (ESC) service 90 and a VTOL motor ESC 92. Enumerated process steps include the following:

1. A user at control station 10 requests a page: e.g., Vertical Takeoff & Landing (VTOL) System Page 94
2. The webserver 32 serves browser supported content (HTML, JavaScript, etc.) via browser supported protocols (e.g., HTTP/HTTPS/WebSocket/WebRTC)
3. The user interacts with the browser to send a command (e.g., Arm VTOL motors)
4. The web server 32 passes command to system specific service using inter-process communication or internal web server service: e.g., Translated VTOL motor command sent over DDS
5. Corresponding service translates the Web API command to a specific format of the target system component: e.g., Arm motor CAN message sent to the VTOL motor engine speed controllers (ESCs) 90, 92
6. System component response with vender specific API: e.g., VTOL motor state via a CAN message
7. Interfacing software service translates the vender specific format and communicates with the web server 32 via the webserver API, inter-process communication, or function calls as an internal service: e.g., VTOL motor state telemetry via DDS
8. The webserver 32 sends the response from the command from the UV 22 to the user via browser supported protocols (HTTP/HTTPS/WebSocket/WebRTC). Served web content updates the user interface page 54 with the updated system state: e.g., Displaying VTOL motors "ARMED"

While various embodiments of the invention have been particularly shown and described, it will be understood by those skilled in the art that various changes in form and details may be made therein without departing from the scope of the invention as defined by the appended claims.

What is claimed is:

1. A system for remote operation of an unmanned aerial vehicle (UAV), comprising:

a control station used by an operator and having a communication link for operating the (UAV), the control station executing a web browser capable of (1) receiving web pages of a (UAV) control web application, (2) rendering the web pages on the control station, (3) receiving control input from the operator via rendered web pages, and (4) generating corresponding messages on the communication link based on the control input; and a hosted server system coupled to the control station via the communication link and to internal subsystems of the (UAV) for control, the hosted server system (1) executing a web server serving the web pages of the (UAV) control web application to the control station for the rendering, receiving and generating operations of the web browser, and (2) generating back-end controls to the internal subsystems of the UAV based on the control input from the operator via the UAV control web application, the hosted server system including a server device located in the UAV, the server device executing the web server and being coupled to the communication link to (i) transmit the web pages of the UAV control web application to the control station and (ii) receive the messages from the control station based on the control input, the server device also being coupled to the internal subsystems of the UAV by a local-area communication link of the UAV to generate the back-end controls and provide the back-end controls to the internal subsystems of the UAV based on the control input from the operator as reflected in the received messages;

wherein the server device is constructed and arranged to receive vertical takeoff and landing (VTOL) motor response signals from the internal subsystems through the local-area communication link in response to VTOL motor control signals and translate the VTOL motor response signals into VTOL motor status for delivery as web content to the control station.

2. The system of claim 1, wherein the internal subsystems to which the hosted server system is coupled include autopilot, engine control unit, GPS, radio, mission payloads, and data storage device.

3. The system of claim 2, wherein the mission payloads include one or more of camera, electronic warfare, communications relay, and effects.

4. The system of claim 1, wherein the control provided by use of the hosted server system includes movement control, mission control, navigation, and system monitoring.

5. The system of claim 4, wherein the web pages of the UAV control web application include pages for mission planning, launch, mission control, navigation control, health/status monitoring, and landing.

6. The system of claim 1, wherein the web server manages protocol services for communicating with the UAV subsystems by utilizing Input Output (I/O) protocols.

7. The system of claim 6, wherein the web server obtains real time status feedback and tasking capability over the UAV subsystems from protocol service interactions.

8. The system of claim 1, wherein the web server is operative to publish UAV subsystem telemetry allowing real time status updates within the web browser.

9. The system of claim 1, wherein the web server is operative to define an application interface (API) for tasking state and command data to the UAV, and wherein interactions between the operator and web browser are transmitted to the web server and processed and routed as I/O commands to the autopilot and subsystems.

10. The system of claim 1, wherein the received messages include VTOL commands;

wherein the server device is further constructed and arranged to generate and provide at least some of the back end controls by translating the VTOL commands into VTOL motor control signals and sending the VTOL motor control signals to the internal subsystems through the local area communication link to control a set of VTOL motors of the UAV.

11. The system of claim 10, wherein the VTOL commands include a VTOL motor arm command;

wherein the VTOL motor control signals include a VTOL motor arm signal based on the VTOL motor arm command;

wherein the VTOL motor response signals include a VTOL motor arm response; and wherein the VTOL motor status includes a VTOL motor state indicating whether the set of VTOL motors is armed.

* * * * *